(12) United States Patent
Barrie et al.

(10) Patent No.: US 10,912,421 B2
(45) Date of Patent: Feb. 9, 2021

(54) COOKWARE HANDLE COVER

(71) Applicants: Ryan Barrie, Seattle, WA (US); Michael Barrie, Seattle, WA (US)

(72) Inventors: Ryan Barrie, Seattle, WA (US); Michael Barrie, Seattle, WA (US)

( * ) Notice: Subject to any disclaimer, the term of this patent is extended or adjusted under 35 U.S.C. 154(b) by 91 days.

(21) Appl. No.: 15/989,128

(22) Filed: May 24, 2018

(65) Prior Publication Data

US 2018/0279838 A1   Oct. 4, 2018

(51) Int. Cl.
*A47J 45/10* (2006.01)
*A47J 45/07* (2006.01)

(52) U.S. Cl.
CPC ............. *A47J 45/10* (2013.01); *A47J 45/071* (2013.01)

(58) Field of Classification Search
CPC ..... Y10T 16/495; Y10T 16/466; Y10T 16/48; Y10T 74/20876; A47J 45/10; A47J 45/071; A47J 45/08; A47J 45/085; B65D 65/00; B65D 65/10; B65D 25/28; B65D 25/2814
USPC ............ 220/753, 752, 573.1, 754, 755, 759; 38/95; 2/16
See application file for complete search history.

(56) References Cited

U.S. PATENT DOCUMENTS

| | | | |
|---|---|---|---|
| 1,155,792 A | 10/1915 | Cahn | |
| 1,162,896 A * | 12/1915 | Achberger | A47J 45/08 220/753 |
| 1,487,749 A * | 3/1924 | Martus | A47J 45/10 16/421 |
| 1,712,675 A * | 5/1929 | Olsen | A47J 45/10 220/753 |
| 4,197,611 A * | 4/1980 | Bell | A47J 45/08 16/DIG. 12 |
| 2006/0237470 A1 * | 10/2006 | Zanne et al. | A47J 45/10 16/421 |
| 2008/0316868 A1 * | 12/2008 | Sardis | G04G 17/00 368/10 |

* cited by examiner

*Primary Examiner* — James N Smalley
*Assistant Examiner* — Elizabeth J Volz
(74) *Attorney, Agent, or Firm* — Ross Brandborg

(57) ABSTRACT

A panhandle cover made of a heat-resistant material including leather is generally of a longitudinally-split tubular configuration with its longitudinal split having the converging flanks overlapping one inside the other. The nature of genuine leather enables the flanks to conform to any panhandle as it wraps around the handle. The flexibility of the leather cover adapts to the handle with conformity to the handle-configuration through use.

2 Claims, 3 Drawing Sheets

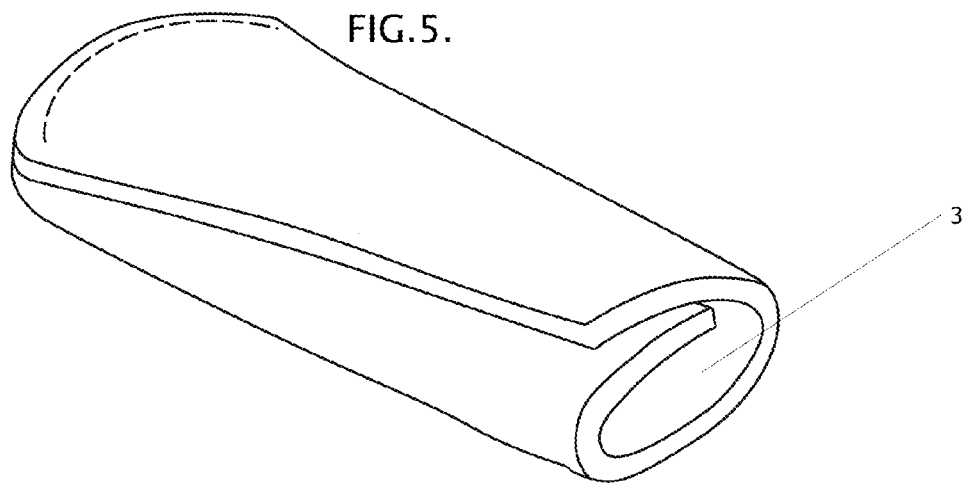
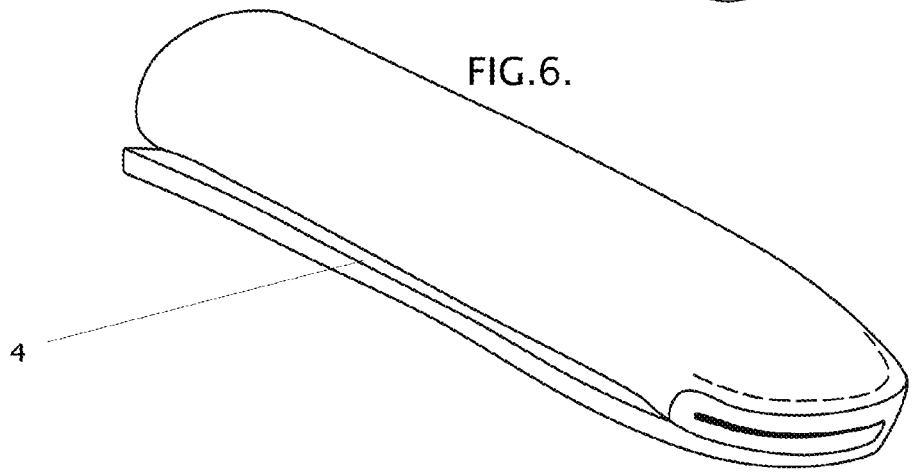
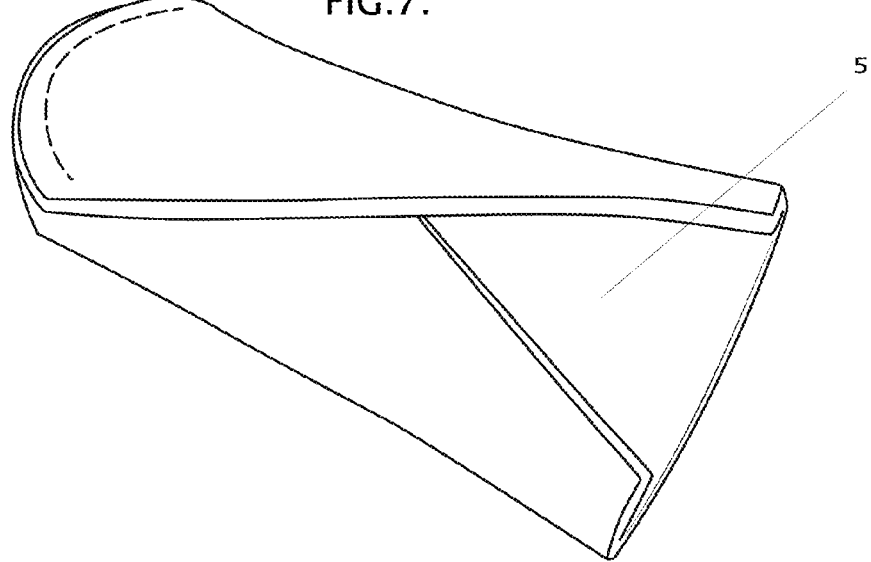

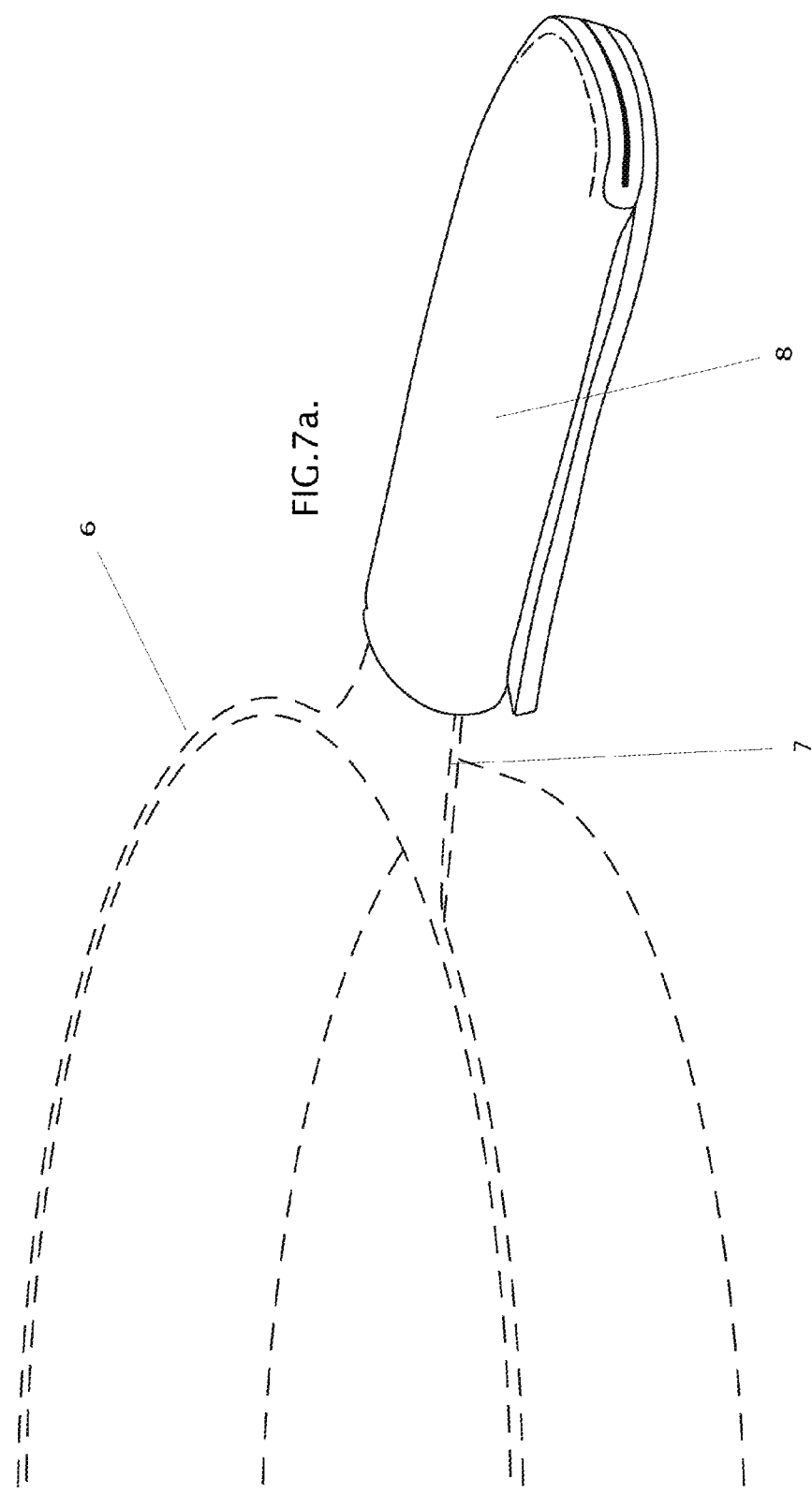

COOKWARE HANDLE COVER

RELATED APPLICATIONS

N/A

FEDERALLY SPONSORED RESEARCH

N/A

SEQUENCE LISTING OR PROGRAM

N/A

BACKGROUND

This invention relates to cookware handle covers.

The handles of cookware, especially cast iron frying pans, can often become too hot to be held directly and safely during cooking. The problem can be dealt with using oven gloves but these tend to be cumbersome, and cloth between the hand and the handle can unintentionally hang down onto the heating element or fire creating a risk of fire or burns.

It is an object of the present invention to provide a cover for a cookingware that allows the cookware to be used safely and the cover easily removed.

SUMMARY

The present invention is a panhandle cover comprising an elongated element of heat-resistant material that is generally of a longitudinally-split tubular member with the flanks of the longitudinal member split and coming together in an overlapping fashion and fastened together at one end of the longitudinal portion, creating an open end and a closed end. The cover has the flexibility to enable the flanks on the open end and down the overlapping middle of the cylinder to flex apart and be slid over a panhandle and flexing back together once the cover is slid in palace creating a formed fit.

The tubular member is generally created with a flat piece of heat resistant material rolled around on itself fastened on one end making the split where the edges come together not fastened to each other.

While it is envisioned that the invention could be comprised of several heat resistance materials, one of those materials is leather. The advantages to leather are not immediately apparent, however leather has high heat resistance and most importantly will conform to the shape of the panhandle with use. This conformity to the panhandle increases with use and the heating and cooling of the cover.

Advantages

The functional design of this handle cover allows one cover to fit a wide variety of cooking ware handles while conforming to each unique size and shape. It allows a user to handle the cookware without burning the user's hand. The cover is removable for cleaning or placing on a different cookware item.

BRIEF DESCRIPTION OF THE DRAWINGS

FIG. 5 shows an isometric view of the invention from the pan end of the invention.

FIG. 6 shows an isometric view of the invention from grip end of the invention.

FIG. 7 is an isometric view of the invention from the bottom highlighting the flanges overlap and not fastened together.

FIG. 7a shows the invention on a pan in use.

DETAILED DESCRIPTION

Figure 1:
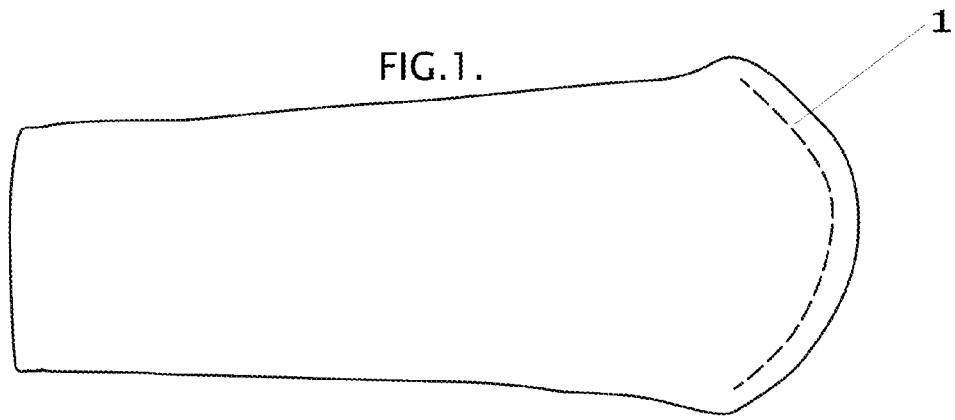
FIG. 1 shows the top of the invention with a seam on the grip end of the invention.
Figure 2:
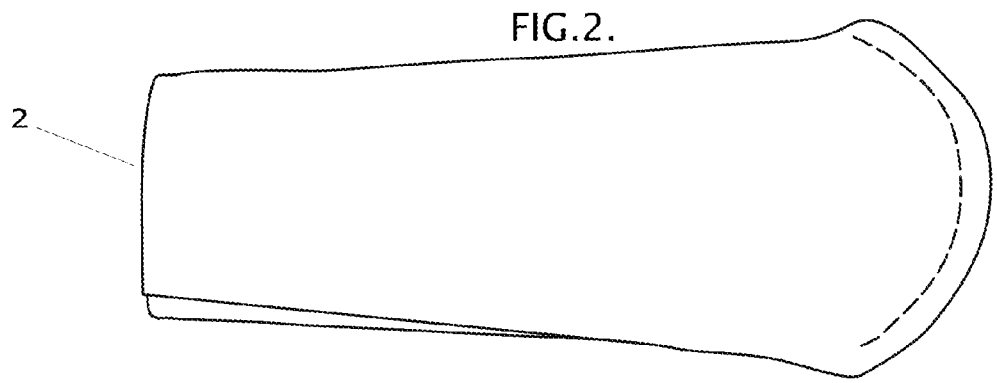
FIG. 2 shows the top of the invention highlighting the pan end of the invention where the overlap of the invention can be seen.
Figure 3:
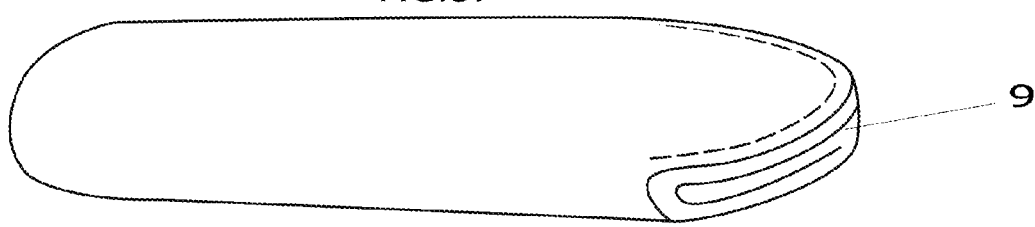
FIG. 3 shows a side angle one of the invention and the layers of the invention can be seen.
Figure 4:
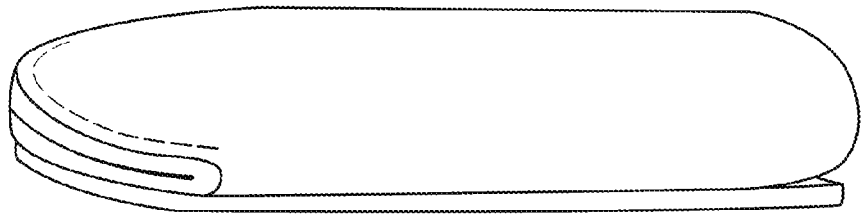
FIG. 4 shows the side of the side angle two of the invention where the lawyer of the invention can be seen.

The invention is comprised of a flat piece of flexible heat resistant material. The flat piece of material is rolled into a tubular member (8) resembling a cylinder. The tubular member (8) has two ends, one end is called the pan end (2) (the end where the panhandle slides in), and the other is the grip end (1) (the end that will be positioned at the end of the handle and fastened closed). The grip end of the tubular member has overlapping layers (9) of material and is squeezed together and then fastened together (9) in a fastening means perpendicular to the length of the tubular member, thus making the grip end of the tubular member flattened (9) and sealed.

The flat piece, when rolled into the tubular member (8) and having the layers (flanges) overlap, is not fastened along its longitudinal direction (4), leaving a slit (5) which allows for flexibility when sliding the cover onto a handle. This slit (5) also helps the cover conform to different sized handles.

To use the cover (8) the open end (2) is slid onto the frying pan (6) handle (7). The flexible material and slit (5) allow the cover (8) to conform to the handle (7) size. Once in place, the cover (8) protects the user's hand from being burned by a hot handle (7).

The invention claimed is:

1. A removable, insulated hand grip device for an elongated handle on cookware, the hand grip device comprising:
    a body formed of;
    a longitudinal cylinder,
    with the longitudinal edge flanges coming together and overlapping and not fastened together forming a slit and,
    the longitudinal cylinder fastened into a flat seal on one end and coplanar with the flanges and perpendicular to the longitudinal direction, and the opposite end of the cylinder open with the flanges not fastened together from the sealed end to the opposite end of the cylinder.

2. A method of insulating a cookware handle comprising of:
    covering the cookware handle with,
    a longitudinal cylinder with overlapping edge flanges that are shaped by rolling a flat piece of flexible material so the edges flanges come together and overlap forming the longitudinal cylinder-shaped cover,
    and the cylinder-shaped cover fastened into a flat seal on one end perpendicular to the longitudinal direction leaving the overlapping edges not fastened leaving one end of the cylinder open with the edge flanges loose from the opening on the end of the cylinder to the seal.

* * * * *